June 20, 1950   R. W. BAINBRIDGE ET AL   2,512,082
SCREW THREADED FASTENER
Filed May 17, 1948
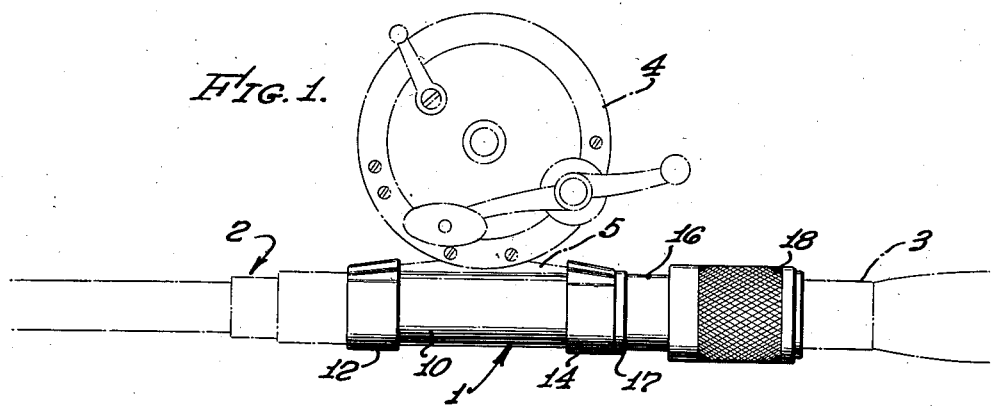
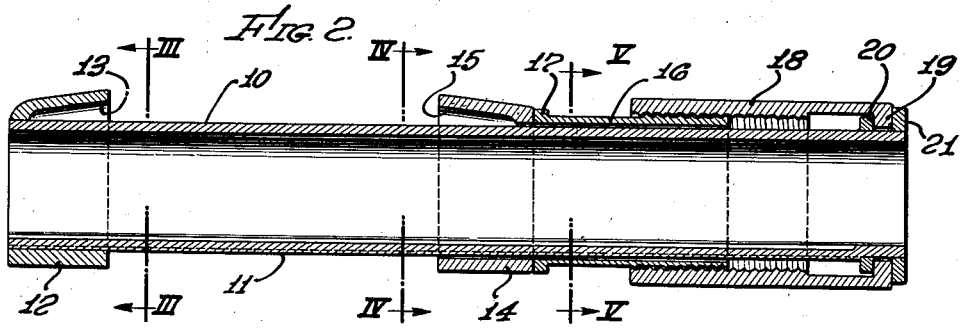
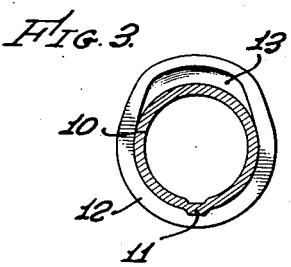
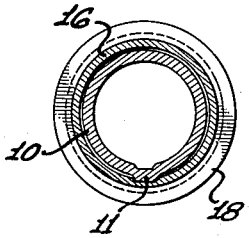
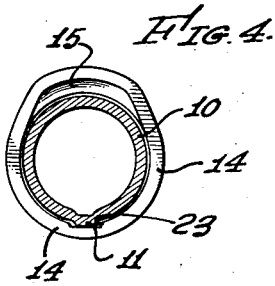
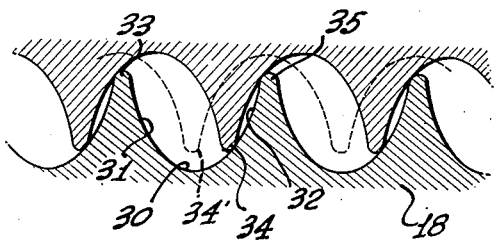
RICHARD W. BAINBRIDGE,
ROBERT L. JORDAN,
INVENTORS.
BY
ATTORNEY.

Patented June 20, 1950

2,512,082

UNITED STATES PATENT OFFICE 2,512,082

SCREW THREADED FASTENER

Richard W. Bainbridge and Robert L. Jordan, South Pasadena, Calif.; said Jordan assignor to said Bainbridge Application May 17, 1948, Serial No. 27,485

1 Claim. (Cl. 85—46)

This invention relates to the construction of reel seats for use on fishing tackle, the reel seat of this invention being characterized by its stability, economic construction and ease of operation. The invention is particularly directed to an adjustable reel seat whereby reels may be detachably connected, the reel seat also furnishing a means for connecting a detachable rod and handle.

Fishing rods and their component parts are subjected to considerable abuse, inasmuch as they are exposed to various weather conditions and placement on sand, earth, whereby grit, sand and other foreign matter may readily enter the movable or working parts. Most reel seats are provided with means whereby the clamping bar of a fishing reel may be connected thereto. In many instances, the clamping means include a threaded member and a pair of nuts, whereby the threaded member may be moved or adjusted and held in a desired clamping position. Such construction has numerous disadvantages, among them being the limited size or surface area of the nuts. These relatively small nuts are difficult to adjust and, moreover, have a tendency to stick or freeze together, necessitating the use of much force or extraneous tools in loosening them to remove a reel or to dismantle the tackle. Moreover, prior constructions made no provisions for either preventing the ready entry of sand, grit and other foreign matter, nor provided means whereby the sand or grit was precluded from damaging the threads or other working parts. Finally, light weight is a highly desirable characteristic of fishing reels, and prior constructions involve numerous parts which increase the weight of the equipment.

It is an object of the present invention, therefore, to disclose and provide a relatively light weight reel seat including a tubular body adapted to receive and firmly hold the fishing rod or tip, a handle and a removably attachable fishing reel. Generally stated, the tubular body member contemplated by this invention carries a fixed clamp collar attached to the head of the body, a lower clamp ring adapted for longitudinal movement upon the body, a locking sleeve slidably carried by the body, said locking sleeve being externally threaded, and an internally threaded nut sleeve mounted for rotation about the body, said single nut sleeve being internally threaded for cooperation with the locking sleeve. The internally threaded nut sleeve is large and covers the threads of the locking sleeve, so that the sleeve may be readily actuated. Moreover, the invention contemplates that the threads are formed in the sleeves in such manner that large crest clearance exists between mating threads, preventing sand, grit or other foreign matter from clogging the threads. The use of locking nuts is eliminated, the threads themselves engaging in suchwise as to prevent accidental dislodgement.

An object of the present invention, therefore, is to disclose and provide a new and improved reel seat.

A further object of the invention is to disclose and provide a reel seat which is free from locking nuts and which presents a large, easily grasped, knurled surface by means of which the clamping members may be actuated.

A still further object of the invention is to disclose and provide a reel seat in which threaded surfaces are normally covered and protected from the abrasive action of grit, sand and other foreign matter.

These and other objects of the invention will become apparent to those skilled in the art from the following description of an exemplary form of the invention. In such description, reference will be had to the appended drawings, in which:

Fig. 1 is a side elevational view of a reel seat, the reel being shown in broken lines, together with a portion of the rod tip and butt.

Fig. 2 is a longitudinal, vertical, sectional view taken through the seat shown in Fig. 1.

Fig. 3 is a sectional view taken along the plane III—III of Fig. 2.

Fig. 4 is a sectional view taken along the plane IV—IV of Fig. 2.

Fig. 5 is a sectional view taken along the plane V—V of Fig. 2.

Fig. 6 is a greatly enlarged fragmentary view of the threads utilized in the reel seat.

In the drawings, the reel seat is generally indicated at 1, the butt or ferrule end of the rod is indicated at 2, a removable handle is indicated at 3 and the reel is indicated at 4.

The reel seat 1 comprises a tubular body member 10 and is provided with a longitudinally extending, outwardly directed key 11, which may be formed by pressing a ridge of metal out of the wall of the tubular body member 10. The tubular body is arranged to receive and grasp the ferrule carried by the butt section of the rod 2 and a corresponding ferrule carried by the upper end of a handle, such as 3. In this manner, the reel seat forms a means of connecting the handle and rod.

Mounted upon the body member are two clamp collars. Both of these clamp collars may be provided with keyways arranged to cooperate with the key 11. A clamp collar 12 is firmly attached to the head end of the body 10 by engagement with the key 11 and by soldering or the like. A portion of the skirt of the clamp collar 12 is flared away from the body 10 to form a recess 13 adapted to receive one end of a clamp bar 5 of the reel 4.

Slidably mounted upon the body 10 is a clamp ring 14, also provided with a keyway arranged to cooperate with the key 11 of the body 10. A portion of the skirt of the clamp ring 14 is flared away from the body 10 so as to provide a recess 15 adapted to receive the other end of the clamp bar 5 of the reel.

Longitudinally movable along the body 10 is a locking sleeve 16 provided with a keyway cooperating with the key 11. The locking sleeve 16 may be provided with a shoulder 17 adapted to abut the clamp ring 14. The butt end of the locking sleeve 16 is externally threaded and in engagement with an external, cylindrical, internally threaded nut sleeve 18. The nut sleeve 18 is provided with an inwardly extending, circular flange 19 arranged to keep the main portion of the nut sleeve 18 positioned concentrically about the body 10. Longitudinal movement of the nut sleeve 18 is prevented by means of stop rings 20 and 21, which may be soldered or otherwise firmly held by the tubular body 10. These stop rings 20 and 21 slidably contact opposing faces of the flange 19, thereby preventing longitudinal movement of the nut sleeve 18, while permitting its ready rotation about the body 10.

It may be noted that the external surface of the nut sleeve 18 is knurled or otherwise roughened, so as to facilitate grasping and operation thereof. Moreover, the nut sleeve has a greater length than the threaded portion of the locking sleeve 16, thereby permitting almost the entire length of the locking sleeve 16 to be covered by the nut sleeve when the device is in a collapsed position.

The external threads on the locking sleeve 16 and the internal mating threads on the nut sleeve are of a self-clearing type. Moreover, in their preferred form, the profile of these threads is such that substantially no appreciable side wall contact exists. The profile of the threads is such that grit, sand, earth, foreign matter, may enter between the mating threads without jamming them or otherwise impairing their utility.

The self-clearing and self-locking threads employed in the preferred embodiment of this invention are illustrated in Fig. 6. It will be noted that the threads exhibit a virtually parabolic profile, the sides 31 and 32 being congruent. The threads are characterized by having a relatively small pointed crest, such as 33 and 34. Moreover, the distance between the points of engagement is appreciably smaller than the depth of the threads. When, for example, no appreciable longitudinal pressure exists between the locking sleeve 16 and the nut sleeve 18, the crest 34 may well ride in the position indicated in dash lines at 34', and in this position it will be noted that considerable space exists between the threads formed in the nut sleeve 18 and the locking sleeve 16. Obviously, grit or other foreign matter could exist between these two mating threads without detriment. When, however, a reel is being fitted to the seat and the locking sleeve 16 is being forced longitudinally along the tubular body 10 by rotation of the nut sleeve 18, the locking sleeve forcing the clamp ring 14 onto the end of the clamp bar of the reel, the mating threads will assume the position indicated in full lines in Fig. 6, and the crest 34 will engage the side wall 32, whereas the crest 35 will engage the side wall of the mating thread. It will be noted that only line contact along the crests will exist between the two mating threads. As the clamping bar of the reel is grasped by the clamping ring and clamp collar, concentrated lines of pressure exist between the crests of the teeth on the locking sleeve and nut sleeve, and the threads thereby become stressed and hold the clamping ring in position.

It will be evident that the threads described hereinabove do not depend on large surface area in contact, but instead depend upon spaced lines of contact in order to hold the two threaded members in locked position. In actual practice, it has been found that reels may be quickly seated and unseated by the use of the construction described hereinabove. Appreciable quantities of sand and other foreign matter may constantly find their way between the two threaded members 16 and 18 without impairing the efficiency of the device or interfering with the utility of the reel seat. It may be noted, however, that relatively resilient metals should be employed for both the locking sleeve and nut sleeve, and in actual practice chromium-plated brass tubing has been found very effective.

Although the lower clamp ring 14 has been shown as a separate element, it may be integral with the sleeve 16. Advantageously, however, the clamp ring 14 is formed as a separate element, permitting the use of lighter material in the locking sleeve 16. Furthermore, since the clamp bars of some reels may be slightly misaligned, it has been found desirable to employ a relatively large keyway, such as is indicated at 23 in the clamp ring 14, permitting the ring 14 to partially rotate about the body 10 and thereby assume a position more receptive to the engagement of the clamp bar of the reel.

By forming the key 11 throughout the length of the body 10, a groove or recess is formed in the inner surface of the body 10 and this groove facilitates the insertion and removal of the ferruled ends of the butt of the rod and the handle. The groove prevents the formation of a vacuum within the body 10 when the assembly is being dismantled.

From the description given hereinabove, it will be evident that the entire reel seat may be simply constructed, has few parts, may be readily cleaned, is easily adjusted and will not clog or wear rapidly when subjected to abuse. It is to be noted that no adjacent locking nuts are employed, the reel being clamped upon the seat simply by the engagement of the crests of the mating threads formed in the locking sleeve and nut sleeve. All changes and modifications coming within the scope of the appended claim are embraced thereby.

We claim:

In a device including a longitudinally movable member in threaded engagement with a rotatable, longitudinally immovable member, the provision of: mating threads formed with relatively small pointed crests, the root and sides of each thread forming a congruent, virtually parabolic profile, the distance between the points of engagement being appreciably smaller than the depth of the threads, whereby large crest clearance exists between said mating threads.

RICHARD W. BAINBRIDGE.
ROBERT L. JORDAN.

REFERENCES CITED

The following references are of record in the file of this patent:

UNITED STATES PATENTS

| Number | Name | Date |
| --- | --- | --- |
| 911,117 | Croiser | Feb. 2, 1909 |
| 1,980,317 | Clark et al. | Nov. 13, 1934 |
| 2,029,188 | Potter | June 28, 1936 |